3,523,121
CERTAIN 2-CARBAMOYL-3-ISOTHIAZOLENES

Sheldon N. Lewis, Willow Grove, George A. Miller, Glenside, and Andrew B. Law, Levittown, Pa., assignors to Rohm and Haas Company, Philadelphia, Pa., a corporation of Delaware
No Drawing. Continuation-in-part of application Ser. No. 621,780, Mar. 9, 1967. This application Oct. 3, 1967, Ser. No. 672,437
Int. Cl. C07d 91/10
U.S. Cl. 260—306.7                    7 Claims

ABSTRACT OF THE DISCLOSURE

Disclosed herein are certain novel compounds which are most properly designated as 3-isothiazolones. These compounds and compositions thereof exhibit a broad spectrum of biocidal properties and are particularly effective for the control of microorganisms. While the compounds of this application are generically 3-isothiazolones, the majority may be more specifically designated as 2-alkyl-3-isothiazolones, 2-carbamoyl and 2-thiocarbamoyl-3-isothiazolones.

CROSS-REFERENCES TO RELATED APPLICATIONS

This application is a continuation-in-part of U.S. Ser. No. 621,780, filed on Mar. 9, 1967, now abandoned.

This invention relates to novel substituted 3-isothiazolones, salts thereof, their preparation, agricultural compositions containing them, and their utilization in the control of living organisms.

These novel 3-isothiazolones (hereinafter referred to at times as "isothiazolones") may be represented by the formula

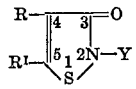

wherein Y is alkyl of 1 to 18 carbon atoms, preferably 3 to 18 carbon atoms; cycloalkyl of 3 to 6 carbon atoms; aralkyl of up to 10 carbon atoms; halogen, lower alkyl, or lower alkoxy substituted aralkyl of up to 10 carbon atoms; aryl; halogen, nitro, lower alkyl, lower alkylacylamino, lower carbalkoxy or sulfamyl substituted aryl; lower hydroxyalkyl; lower haloalkyl; lower dialkylaminoalkyl; or a carbamoyl group having the structure

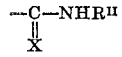

When Y is any of the above substituents other than the carbamoyl group, then R and $R^I$ may be hydrogen, halogen or lower alkyl, provided that when Y is methyl or ethyl then both R and $R^I$ may not be hydrogen.

When Y is the carbamoyl group, then R may be hydrogen, lower alkyl, halogen or cyano;
$R^I$ may be hydrogen, halogen, lower alkyl or lower haloalkyl when R is hydrogen, lower alkyl or halogen;
$R^I$ may be lower alkylthio, lower alkylsulfinyl or lower alkylsulfonyl when R is cyano;
X may be oxygen or sulfur; and
$R^{II}$ may be alkyl of 1 to 18 carbon atoms, lower alkylsulfonyl, arylsulfonyl, halogen or lower alkyl substituted arylsulfonyl, carbalkoxyalkyl of the structure

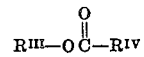

wherein $R^{III}$ is lower alkyl and $R^{IV}$ is an alkylene group of 1 to 4 carbon atoms, or $R^{II}$ may be an aryl group of the formula

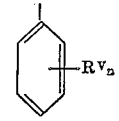

wherein $R^V$ may be lower alkyl, halogen, nitro or alkoxy of 1 to 4 carbon atoms and $n$ is an integer from 0 to 3.

Where the expression "lower" is employed in conjunction with terms, such as alkyl, haloalkyl, alkylthio, alkylsulfinyl, alkylsulfonyl, etc., it is intended to indicate that the alkyl or alkyl portion thereof has a carbon content of 1 to 4 carbon atoms. Typically, the alkyl or alkyl portion may be methyl, ethyl, propyl, isopropyl, butyl, t-butyl and the like.

Some of the isothiazolones described above can form novel acid salts which also exhibit biocidal activity. Such salt forming compounds fall within the scope of Formula I wherein Y is alkyl of 1 to 18 carbon atoms; cycloalkyl of 3 to 6 carbon atoms; aralkyl of up to 10 carbon atoms; halogen, lower alkyl, or lower alkoxy substituted aralkyl of up to 10 carbon atoms; aryl; halogen, nitro, lower alkyl, lower alkylacylamino, lower carbalkoxy or sulfamyl substituted aryl; lower hydroxyalkyl; lower haloalkyl; or lower dialkylaminoalkyl; and R and $R^I$ are selected from the group consisting of hydrogen, lower alkyl, or halogen.

Preparation of these biocidally active salts is readily achieved by reacting the above designated 3-isothiazolones with a strong acid. Typical strong acids include hydrochloric, nitric, sulfuric, hydrobromic and the like. Separation of the acid salts from the reaction medium is accomplished by any convenient means known to one skilled in the art.

Representative Y substituents include methyl, ethyl, propyl, isopropyl, butyl, octyl, decyl, pentadecyl, octadecyl, cyclopropyl, cyclohexyl, benzyl, 3,4-dichlorobenzyl, 4-methoxybenzyl, 3,4-dichlorophenyl, hydroxymethyl, chloromethyl, chloropropyl, diethylaminoethyl, carbamoyl, thiocarbamoyl, methylcarbamoyl, propylcarbamoyl, t-octylcarbamoyl, phenylcarbamoyl, ethoxyphenylcarbamoyl, nitrophenylcarbamoyl, carbethoxymethylcarbamoyl, methylthiocarbamoyl and ethylthiocarbamoyl.

Representative R substituents include hydrogen, bromo, chloro, iodo, cyano, methyl, ethyl, propyl, isopropyl, butyl and t-butyl.

Representative $R^I$ substituents are hydrogen, chloro, bromo, iodo, methyl, ethyl, propyl, butyl, chloromethyl, chloropropyl, bromomethyl, bromoethyl, bromopropyl, bromobutyl, methylthio, propylthio, methylsulfinyl, ethylsulfinyl, butylsulfinyl, methylsulfonyl, ethylsulfonyl, propylsulfonyl and butylsulfonyl.

Representative $R^{II}$ substituents are methyl, ethyl, propyl, isopropyl, butyl, t-butyl, pentyl, isopentyl, hexyl, cyclohexyl, heptyl, octyl, t-octyl, nonyl, decyl, dodecyl, octadecyl, phenyl, 2-methylphenyl, 4-methylphenyl, 4-ethylphenyl, 2,4-dimethylphenyl, 2-chlorophenyl, 3-chlorophenyl, 4-chlorophenyl, 2,5-dichlorophenyl, 3,4-dichlorophenyl, 3,4-dibromophenyl, 2-bromophenyl, 3,4,5-trichlorophenyl, 4-nitrophenyl, 2,4-dinitrophenyl, 4-methoxyphenyl, 2-ethoxyphenyl, 3,5-dimethoxyphenyl, methylsulfonyl, ethylsulfonyl, 4-chlorophenylsulfonyl, 4-methylphenylsulfonyl, 3,5-dimethylphenylsulfonyl, carbethoxymethyl and carbethoxyethyl.

Typical compounds within the scope of Formula I include the following:

2-propyl-3-isothiazolone,
2-butyl-3-isothiazolone,
2-t-octyl-3-isothiazolone,
2-decyl-3-isothiazolone,
2-octyldecyl-3-isothiazolone,
2-cyclohexyl-3-isothiazolone,
4-chloro-2-methyl-3-isothiazolone,
4-bromo-2-methyl-3-isothiazolone,
5-chloro-2-methyl-3-isothiazolone,
5-chloro-2,4-dimethyl-3-isothiazolone,
4-bromo-5-chloro-2-methyl-3-isothiazolone,
4-bromo-2-cyclohexyl-3-isothiazolone,
4,5-dichloro-2-ethyl-3-isothiazolone,
4-methyl-2-octyl-3-isothiazolone,
4,5-dimethyl-2-octyl-3-isothiazolone,
2-benzyl-3-isothiazolone,
2-benzyl-4,5-dichloro-3-isothiazolone,
2-benzyl-5-chloro-3-isothiazolone,
2-(2',4'-dichlorobenzyl)-3-isothiazolone,
2-(4'-methoxybenzyl)-3-isothiazolone,
2-(4'-ethylbenzyl)-3-isothiazolone,
2-(3',4'-dichlorophenyl)-3-isothiazolone,
2-(3',4'-dichlorophenyl)-4-methyl-3-isothiazolone,
2-(4'-methylphenyl)-3-isothiazolone,
2-hydroxymethyl-3-isothiazolone,
2-(β-diethylaminoethyl)-3-isothiazolone,
2-(N-methylcarbamoyl)-3-isothiazolone,
2-(N-ethylcarbamoyl)-3-isothiazolone,
2-(N-n-propylcarbamoyl)-3-isothiazolone,
2-(N-i-propylcarbamoyl)-3-isothiazolone,
2-(N-butylcarbamoyl)-3-isothiazolone,
2-(N-hexylcarbamoyl)-3-isothiazolone,
2-(N-t-octylcarbamoyl)-3-isothiazolone,
2-(N-decylcarbamoyl)-3-isothiazolone,
2-(N-dodecylcarbamoyl)-3-isothiazolone,
5-methyl-2-(N-methylcarbamoyl)-3-isothiazolone,
5-methyl-2-(N-ethylcarbamoyl)-3-isothiazolone,
5-propyl-2-(N-methylcarbamoyl)-3-isothiazolone,
5-butyl-2-(N-methylcarbamoyl)-3-isothiazolone,
4-bromo-2-(N-methylcarbamoyl)-3-isothiazolone,
4-bromo-5-methyl-2-(N-methylcarbamoyl)-3-isothiazolone,
4-chloro-5-methyl-2-(N-methylcarbamoyl)-3-isothiazolone,
4-cyano-5-methylthio-2-(N-methylcarbamoyl)-3-isothiazolone,
4-cyano-5-methylsulfinyl-2-(N-methylcarbamoyl)-3-isothiazolone,
4-cyano-5-methylsulfonyl-2-(N-methylcarbamoyl)-3-isothiazolone,
5-methyl-2-(N-phenylcarbamoyl)-3-isothiazolone,
4-cyano-5-methylthio-2-(N-phenylcarbamoyl)-3-isothiazolone,
4-bromo-5-methyl-2-(N-3'-chlorophenylcarbamoyl)-3-isothiazolone,
5-bromomethyl-2-(N-3'-chlorophenylcarbamoyl)-3-isothiazolone,
5-bromoethyl-2-(N-3'-chlorophenylcarbamoyl)-3-isothiazolone,
5-methyl-2-(N-3'-chlorophenylcarbamoyl)-3-isothiazolone,
4-cyano-5-methylthio-2-(N-3'-chlorophenylcarbamoyl)-3-isothiazolone,
4-cyano-5-methylsulfinyl-2-(N-3'-chlorophenylcarbamoyl)-3-isothiazolone,
4-cyano-5-butylsulfinyl-2-(N-3'-chlorophenylcarbamoyl)-3-isothiazolone,
2-(N-3'-chlorophenylcarbamoyl)-3-isothiazolone,
5-methyl-2-(N-2'-chlorophenylcarbamoyl)-3-isothiazolone,
4-cyano-5-propylthio-2-(N-2'-chlorophenylcarbamoyl)-3-isothiazolone,
5-bromomethyl-2-(N-2'-chlorophenylcarbamoyl)-3-isothiazolone,
4-bromo-5-methyl-2-(N-3',4'-dichlorophenylcarbamoyl)-3-isothiazolone,
4-cyano-5-methylthio-2-(N-3',4'-dichlorophenylcarbamoyl)-3-isothiazolone,
2-(N-3',4'-dichlorophenylcarbamoyl)-3-isothiazolone,
5-methyl-2-(N-3',4'-dichlorophenylcarbamoyl)-3-isothiazolone,
2-(N-2',5'-dichlorophenylcarbamoyl)-3-isothiazolone,
2-(N-3'-methylphenylcarbamoyl)-3-isothiazolone,
2-(N-3',4'-dimethylphenylcarbamoyl)-3-isothiazolone,
2-(N-2'-ethylphenylcarbamoyl)-3-isothiazolone,
2-(N-3'-butylphenylcarbamoyl)-3-isothiazolone,
2-(N-2'-ethoxyphenylcarbamoyl)-3-isothiazolone,
2-(N-4'-nitrophenylcarbamoyl)-3-isothiazolone,
2-(N-2',4'-dinitrophenylcarbamoyl)-3-isothiazolone,
5-methyl-2-(N-4'-methylphenylsulfonylcarbamoyl)-3-isothiazolone,
4-cyano-5-methylthio-2-(N-4'-methylphenylsulfonylcarbamoyl)-3-isothiazolone,
4-bromo-5-methyl-2-(N-4'-methylphenylsulfonylcarbamoyl-3-isothiazolone,
2-(N-methylthiocarbamoyl)-3-isothiazolone,
5-methyl-2-(N-ethylthiocarbamoyl)-3-isothiazolone,
4-cyano-5-ethylsulfinyl-2-(N-methylthiocarbamoyl)-3-isothiazolone, and
2-(N-carbethoxymethylcarbamoyl)-3-isothiazolone.

Preparation of the novel 2-carbamoyl and thiocarbamoyl substituted isothiazolones of this invention may be accomplished by reacting a 3-hydroxyisothiazole with an isocyanate or isothiocyanate on a substantially equimolar basis. The unsubstituted 3-hydroxyisothiazole can be synthesized from propiolamide by the method of W. D. Crow and N. J. Leonard, J. Org. Chem., 30, 2660–2665 (1965). Substituted 3-hydroxyisothiazoles are disclosed and can be prepared as shown in copending U.S. patent application Ser. No. 621,766, filed on Mar. 9, 1967, now abandoned, and incorporated herein by reference thereto.

A general reaction for the preparation of carbamoyl substituted 3-isothiazolones from 3-hydroxyisothiazoles and isocyanates or isothiocyanates is schematized by the structural equation below:

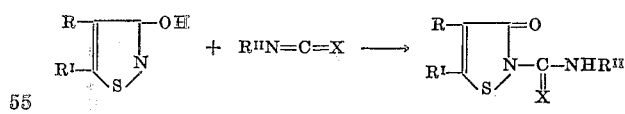

wherein the symbols R, $R^I$, $R^{II}$ and X are as previously defined.

Although an equimolar ratio of reactants is preferred, an excess of up to 2 moles or more of isocyanate or isothiocyanate per mole of 3-hydroxyisothiazole may be employed. In many situations, an inert organic solvent may be utilized in this reaction. Generally, those solvents from the classes of aromatic hydrocarbon, halogenated aromatic hydrocarbon, amide, ester, aliphatic hydrocarbon and ether solvents are preferable. Particularly suitable for the purpose of this invention are those which include benzene, toluene, heptane, ethyl ether, and dioxane. When employing simple isocyanates, the reaction is spontaneous; but with less reactive long chain or aromatic isocyanates, a catalyst or promoter such as a tertiary amine can be profitably utilized. Representative tertiary amines are pyridine and triethylamine. While the reaction temperature is not critical, it is usually conducted in a range of −20° C. to 80° C. or more.

All of the isothiazolones and salts disclosed herein, with the exception of the hydroxyalkyl derivatives, the 2-thiocarbamoyl derivatives and some of the 2-carbamoyl derivatives, can be prepared by the reaction of a substituted disulfide-amide and a halogenating agent. This novel process is completely disclosed in copending U.S. patent application Ser. No. 621,770, filed on Mar. 9, 1967, now abandoned, and incorporated herein by reference thereto.

In addition, the isothiazolones of the formula

(II)

may be prepared by the method of Goerdeler and Mittler as described in Chem. Ber., 96, 944–954 (1963). On Formula II, Y' is defined in the same manner as Y in Formula I excepting therefrom only the lower hydroxyalkyl group, and Z is hydrogen or lower alkyl and
Z' is lower alkyl or lower haloalkyl.

This preparation involves the halogenation of a substituted betathioketo amide in an inert organic ester solvent, such as ethyl acetate. The betathioketo amide referred to may be represented by the formula

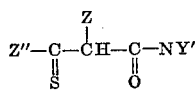

wherein Z and Y' are as defined above and Z" is lower alkyl.

Another process for preparing some of the compounds of this invention is that of Crow and Leonard as set forth in the Journal of Organic Chemistry reference previously cited. Their method entails the converting of a β-substituted thiocyanoacrylamide or thiosulfatoacrylamide to the isothiazolone. This reaction may be represented by the following equation:

wherein Y is as defined for Formula I, Z''' is hydrogen or lower alkyl and M is —SCN or —$S_2O_3^{\ominus}$. Generally and preferably, conversion of the substituted thiocyanoacrylamide or thiosulfatoacrylamide to the isothiazolone is achieved by the treating thereof with an acid, such as for example, sulfuric acid. However, when M is SCN, then transition metal salts, such as nickel sulfate, ferrous sulfate, ferric sulfate, copper sulfate and the like, are also readily utilized. In like manner, when M is $S_2O_3^{\ominus}$, then the conversion can be accomplished with iodine. Preparation of the thiocyanoacrylamide and thiosulfatoacrylamide as taught by Crow and Leonard involves the reacting of a substituted propiolamide with thiocyanic acid or thiosulfate.

The 2-hydroxyalkyl-3-isothiazolone derivatives disclosed herein are obtained by reacting formaldehyde or an alkylene oxide, such as ethylene oxide, propylene oxide and the like, with a 3-hydroxyisothiazole. Preparation of the 2-haloalkyl-3-isothiazolones may be accomplished by reacting a 2-hydroxyalkyl-3-isothiazolone with a halogenating agent, such as thionyl chloride, phosphorus tribromide, phosphorus trichloride and the like.

By way of demonstration, the following examples are offered to illustrate this invention and are not to be construed as limitations thereof. In Table I, the compounds prepared by the above-described processes and constituting Examples 1 through 81 are named and their embodiments indicated. Table II lists the elemental analyses and melting points for the examples previously described in Table I. Specific illustrative preparations of Examples 1, 3, 14, 25, 33, 38 and 55 are set forth below.

EXAMPLE 1

A solution of 5.05 parts (0.05 mole) of 3-hydroxyisothiazole in 88 parts of dry benzene was agitated at 25° C. There was added to the above solution a 50% benzene solution containing 2.85 parts (0.05 mole) of methylisocyanate. Immediately after addition, a white precipitate began to form which grew progressively thicker upon stirring. This stirring was continued overnight. Filtration of the reaction mixture gave 2.0 parts of white solid 2-(N-methylcarbamoyl)-3-isothiazolone with a melting point of 138° to 140° C. After addition of 35 parts of hexane, the filtrate yielded 3.5 parts of additional product with a melting point of 138° to 139° C. In this manner, a total yield of 5.5 parts (70%) of 2-(N-methylcarbamoyl)-3-isothiazolone was obtained.

EXAMPLE 3

To an agitating solution of 2.9 parts (0.029 mole) of 3-hydroxyisothiazole in 88 parts of benzene, 2.1 parts (0.029 mole) of methylisothiocyanate was added. The reaction was heated at 50° to 60° C. for 10 hours and the reaction medium evaporated to leave 2.5 parts of white solid 2-(N-methylthiocarbamoyl)-3-isothiazolone. The product was recrystallized from ethanol.

EXAMPLE 14

To an agitating solution of 3.0 parts (0.025 mole) of 3-hydroxy-5-methyl-isothiazole in 132 parts of dry benzene, 4.0 parts (0.025 mole) of 3-chlorophenylisocyanate was added. The temperature of the exothermic reaction rose from 27° to 48° C. After stirring for two hours, a white solid slurry formed. The solid was filtered off and dried to yield 7.0 parts of 5-methyl-2-(N-3-chlorophenylcarbamoyl)-3-isothiazolone.

EXAMPLE 25

To an agitating solution of 4 parts (0.04 mole) of 3-hydroxyisothiazole in 88 parts of dry benzene, 2.84 parts (0.04 mole) of ethylisocyanate was added dropwise at 25° C. The solution was stirred at 25° C. for 12 hours; then the solvent was evaporated under vacuum to yield 6.0 parts of yellow solid 2-(N-ethylcarbamoyl)-3-isothiazolone. Purification was accomplished by crystallization from a benzene-hexane solution.

EXAMPLE 33

A solution of benzene (66 parts), 3-hydroxyisothiazole (4.0 parts, 0.04 mole) and 1 part of triethylamine was agitated. Then 8.45 parts (0.04 mole) of n-dodecylisocyanate in 22 parts of benzene was added dropwise at 25° C. After stirring for 12 hours, the reaction solution was evaporated to leave 13.0 parts of 2-(N-n-dodecylcarbamoyl)-3-isothiazolone. The product was crystallized from ethanol.

EXAMPLE 38

5-methyl-2-(N-ethylthiocarbamoyl) - 3 - isothiazolone was prepared by reacting 3-hydroxy-5-methylisothiazole and ethylisothiocyanate according to the procedure of Example 3.

EXAMPLE 55

Aqueous formaldehyde (37 percent), 4.5 g. (0.056 mole) was diluted with 25 ml. of water, and then 3.8 g. (0.028 mole) of potassium carbonate was added. Thereafter, 5.5 g. (0.055 mole) of 3-hydroxyisothiazole was added to the formaldehyde solution in one portion. A solid precipitate soon formed, and after 2 hours stirring, was filtered off to yield 1.8 g. of white solid 2-hydroxymethyl-3-isothiazolone.

TABLE I.—3-ISOTHIAZOLONE EXAMPLES

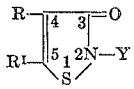

| Example No. | R | R I | Y | Name |
|---|---|---|---|---|
| 1 | H | H | —CONHCH$_3$ | 2-(N-methylcarbamoyl)-3-isothiazolone. |
| 2 | H | CH$_3$ | —CONHCH$_3$ | 5-methyl-2-(N-methylcarbamoyl)-3-isothiazolone. |
| 3 | H | H | —CSNHCH$_3$ | 2-(N-methylthiocarbamoyl)-3-isothiazolone. |
| 4 | Br | CH$_3$ | —CONHCH$_3$ | 4-bromo-5-methyl-2-(N-methylcarbamoyl)-3-isothiazolone. |
| 5 | CN | SCH$_3$ | —CONHCH$_3$ | 4-cyano-5-methylthio-2-(N-methylcarbamoyl)-3-isothiazolone. |
| 6 | CN | SOCH$_3$ | —CONHCH$_3$ | 4-cyano-5-methylsulfinyl-2-(N-methylcarbamoyl)-3-isothiazolone. |
| 7 | CN | SO$_2$CH$_3$ | —CONHCH$_3$ | 4-cyano-5-methylsulfonyl-2-(N-methylcarbamoyl)-3-isothiazolone. |
| 8 | H | H | —CONHC$_4$H$_9$-n | 2-(N-n-butylcarbamoyl)-3-isothiazolone. |
| 9 | H | H | —CONHC$_8$H$_{17}$-t | 2-(N-t-octylcarbamoyl)-3-isothiazolone. |
| 10 | H | CH$_3$ | —CONHC$_6$H$_5$ | 5-methyl-2-(N-phenylcarbamoyl)-3-isothiazolone. |
| 11 | CN | SCH$_3$ | —CONHC$_6$H$_5$ | 4-cyano-5-methylthio-2-(N-phenylcarbamoyl)-3-isothiazolone. |
| 12 | Br | CH$_3$ | —CONHC$_6$H$_4$Cl-3 | 4-bromo-5-methyl-2-(N-3-chlorophenylcarbamoyl)-3-isothiazolone. |
| 13 | H | CH$_2$Br | —CONHC$_6$H$_4$Cl-3 | 5-bromomethyl-2-(N-3-chlorophenylcarbamoyl)-3-isothiazolone. |
| 14 | H | CH$_3$ | —CONHC$_6$H$_4$Cl-3 | 5-methyl-2-(N-3-chlorophenylcarbamoyl)-3-isothiazolone. |
| 15 | CN | SCH$_3$ | —CONHC$_6$H$_4$Cl-3 | 4-cyano-5-methylthio-2-(N-3-chlorophenylcarbamoyl)-3-isothiazolone. |
| 16 | H | H | —CONHC$_6$H$_4$Cl-3 | 2-(N-3-chlorophenylcarbamoyl)-3-isothiazolone. |
| 17 | H | CH$_3$ | —CONHC$_6$H$_4$Cl-2 | 5-methyl-2-(N-2-chlorophenylcarbamoyl)-3-isothiazolone. |
| 18 | H | CH$_2$Br | —CONHC$_6$H$_4$Cl-2 | 5-bromomethyl-2-(N-2-chlorophenylcarbamoyl)-3-isothiazolone. |
| 19 | Br | CH$_3$ | —CONHC$_6$H$_3$Cl$_2$-3,4 | 4-bromo-5-methyl-2-(N-3,4-dichlorophenylcarbamoyl)-3-isothiazolone. |
| 20 | H | CH$_3$ | —CONHC$_6$H$_3$Cl$_2$-3,4 | 5-methyl-2-(N-3,4-dichlorophenylcarbamoyl)-3-isothiazolone. |
| 21 | CN | SCH$_3$ | —CONHC$_6$H$_3$Cl$_2$-3,4 | 4-cyano-5-methylthio-2-(N-3,4-dichlorophenylcarbamoyl)-3-isothiazolone. |
| 22 | H | CH$_3$ | —CONHSO$_2$C$_6$H$_4$CH$_3$-4 | 5-methyl-2-(N-4-tosylcarbamoyl)-3-isothiazolone. |
| 23 | CN | SCH$_3$ | —CONHSO$_2$C$_6$H$_4$CH$_3$-4 | 4-cyano-5-methylthio-2-(N-4-tosylcarbamoyl)-3-isothiazolone. |
| 24 | Br | CH$_3$ | —CONHSO$_2$C$_6$H$_4$CH$_3$-4 | 4-bromo-5-methyl-2-(N-4-tosylcarbamoyl)-3-isothiazolone. |
| 25 | H | H | —CONHC$_2$H$_5$ | 2-(N-ethylcarbamoyl)-3-isothiazolone. |
| 26 | H | H | —CONHC$_3$H$_7$-n | 2-(N-n-propylcarbamoyl)-3-isothiazolone. |
| 27 | H | H | —CONHC$_3$H$_7$-i | 2-(N-i-propylcarbamoyl)-3-isothiazolone. |
| 28 | Br | H | —CONHCH$_3$ | 4-bromo-2-(N-methylcarbamoyl)-3-isothiazolnoe. |
| 29 | H | H | —CONHC$_6$H$_4$-OCH$_3$-4 | 2-(N-4-methoxyphenylcarbamoyl)-3-isothiazolone. |
| 30 | H | H | —CONHC$_6$H$_4$-OCH$_3$-2 | 2-(N-2-methoxyphenylcarbamoyly)-3-isothiazolone. |
| 31 | H | H | —CONHC$_6$H$_4$-NO$_2$-3 | 2-(N-3-nitrophenylcarbamoyl)-3-isothiazolone. |
| 32 | H | H | —CONHC$_6$H$_3$-Cl$_2$-3,4 | 2-(N-3,4-dichlorophenylcarbamoyl)-3-isothiazolone. |
| 33 | H | H | —CONHC$_{12}$H$_{25}$ | 2-(N-n-dodecylcarbamoyl)-3-isothiazolone. |
| 34 | H | H | —CONHC$_6$H$_3$Cl$_2$-2,5 | 2-(N-2,5-dichlorophenylcarbamoyl)-3-isothiazolone. |
| 35 | H | H | —CONHCH$_2$CO$_2$C$_2$H$_5$ | 2-(N-carbethoxymethylcarbamoyl)-3-isothiazolone. |
| 36 | H | H | —CONHC$_6$H$_4$NO$_2$-4 | 2-(N-4-nitrophenylcarbamoyl)-3-isothiazolone. |
| 37 | H | CH$_3$ | —CONHC$_2$H$_5$ | 5-methyl-2-(N-ethylcarbamoyl)-3-isothiazolone. |
| 38 | H | CH$_3$ | —CSNHC$_2$H$_5$ | 5-methyl-2-(N-ethylthiocarbamoyl)-3-isothiazolone. |
| 39 | H | Cl | —CONHC$_2$H$_5$ | 5-chloro-2-(N-ethylcarbamoyl)-3-isothiazolone. |
| 40 | H | H | —C$_3$H$_7$ | 2-n-propyl-3-isothiazolone. |
| 41 | H | H | —C$_4$H$_9$-t | 2-t-butyl-3-isothiazolone. |
| 42 | H | H | —C$_4$H$_9$-n | 2-n-butyl-3-isothiazolone. |
| 43 | H | H | —C$_6$H$_{11}$ | 2-cyclohexyl-3-isothiazolone. |
| 44 | H | H | —C$_8$H$_{17}$-t | 2-t-octyl-3-isothiazolone. |
| 45 | H | H | —CH$_2$C$_6$H$_5$ | 2-benzyl-3-isothiazoloue. |
| 46 | H | Cl | —CH$_3$ | 5-chloro-2-methyl-3-isothiazolone. |
| 47 | H | Cl | —CH$_2$C$_6$H$_5$ | 5-chloro-2-benzyl-3-isothiazolone. |
| 48 | Cl | Cl | —CH$_3$ | 4,5-dichloro-2-methyl-3-isothiazolone. |
| 49 | CH$_3$ | H | —CH$_3$ | 2,4-dimethyl-3-isothiazolone. |
| 50 | CH$_3$ | H | —C$_6$H$_3$Cl$_2$-3,4 | 4-methyl-2-(3,4-dichlorophenyl)-3-isothiazolone. |
| 51 | H | H | —C$_6$H$_3$Cl$_2$-3,4 | 2-(3,4-dichlorophenyl)-3-isothiazolone. |
| 52 | Cl | Cl | —CH$_2$C$_6$H$_5$ | 4,5-dichloro-2-benzyl-3-isothiazolone. |
| 53 | Br | Cl | —CH$_3$ | 4-bromo-5-chloro-2-methyl-3-isothiazolone. |
| 54 | Br | H | —CH$_3$ | 4-bromo-2-methyl-3-isothiazolone. |
| 55 | H | H | —CH$_2$OH | 2-hydroxymethyl-3-isothiazolone. |
| 56 | H | H | —CH$_2$CH$_2$N(CH$_2$CH$_3$)$_2$ | 2-(β-diethylaminoethyl)-3-isothiazolone. |
| 57 | H | H | —C$_3$H$_7$·HCl | 2-n-propyl-3-isothiazolone hydrochloride. |
| 58 | H | Cl | —CH$_3$·HCl | 5-chloro-2-methyl-3-isothiazolone hydrochloride. |
| 59 | H | H | —C$_2$H$_5$·HCl | 2-ethyl-3-isothiazolone hydrochloride. |
| 60 | H | H | —CH$_3$·HCl | 2-methyl-3-isothiazolone hydrochloride. |
| 61 | H | H | —CH$_2$C$_6$H$_5$·HCl | 2-benzyl-3-isothiazolone hydrochloride. |
| 62 | H | H | —C$_{12}$H$_{25}$-n | 2-n-dodecyl-3-isothiazolone. |
| 63 | H | H | —C$_{14}$H$_{29}$-n | 2-n-tetradecyl-3-isothiazolone. |
| 64 | H | H | —CH$_2$-C$_6$H$_4$-Cl-4 | 2-(4-chlorobenzyl)-3-isothiazolone. |
| 65 | H | H | —CH$_2$C$_6$H$_4$-Cl-2 | 2-(2-chlorobenzyl)-3-isothiazolone. |
| 66 | H | H | —CH$_2$-C$_6$H$_3$-Cl$_2$-2,4 | 2-(2,4-dichlorobenzyl)-3-isothiazolone. |
| 67 | H | H | —CH$_2$-C$_6$H$_3$-Cl$_2$-3,4 | 2-(3,4-dichlorobenzyl)-3-isothiazolone. |
| 68 | H | H | —CH$_2$-C$_6$H$_4$-OCH$_3$-4 | 2-(4-methoxybenzyl)-3-isothiazolone. |
| 69 | H | H | —CH$_2$-C$_6$H$_4$-CH$_3$-4 | 2-(4-methylbenzyl)-3-isothiazolone. |
| 70 | H | H | —CH$_2$-CH-(C$_4$H$_9$)C$_2$H$_5$ | 2-(2-ethylhexyl)-3-isothiazolone. |
| 71 | H | H | —CH$_2$CH$_2$-C$_6$H$_5$ | 2-(2-phenylethyl)-3-isothiazolone. |
| 72 | H | Cl | —CH$_2$CH$_2$-C$_6$H$_5$ | 2-(2-phenylethyl)-5-chloro-3-isothiazolone. |
| 73 | H | H | —CH(CH$_3$)C$_6$H$_5$ | 2-(1-phenylethyl)-3-isothiazolone. |
| 74 | H | H | —C$_{10}$H$_{21}$-n | 2-n-decyl-3-isothiazolone. |
| 75 | H | H | —C$_8$H$_{17}$-n | 2-n-octyl-3-isothiazolone. |
| 76 | Cl | H | —C$_8$H$_{17}$-t | 2-t-octyl-4-chloro-3-isothiazolone. |
| 77 | Br | H | —C$_8$H$_{17}$-t | 2-t-octyl-4-bromo-3-isothiazolone. |
| 78 | H | H | —C$_9$H$_{19}$-n | 2-n-nonyl-3-isothiazolone. |
| 79 | H | Cl | —C$_8$H$_{17}$-n | 2-n-octyl-5-chloro-3-isothiazolone. |
| 80 | H | H | —C$_6$H$_4$NO$_2$-4 | 2-(4-nitrophenyl)-3-isothiazolone. |
| 81 | H | H | —C$_6$H$_4$COOC$_2$H$_5$-4 | 2-(4-carbethoxyphenyl)-3-isothiazolone. |

TABLE II.—CHARACTERIZATION OF EXAMPLES

| Example No.: | Melting Point in °C. | Analysis [1] | | | | |
|---|---|---|---|---|---|---|
| | | C | H | N | S | Cl |
| 1 | 138–140 | 38.16(37.9) | 4.04(3.8) | 17.45(17.1) | 20.24(20.2) | |
| 2 | 138–145 | 41.55(41.8) | 4.63(4.7) | 15.60(16.3) | 18.23(18.6) | |
| 3 | 155–158 | 34.62(34.5) | 3.66(3.5) | 15.76(16.1) | 35.52(36.7) | |
| 4 | 191–195 | 28.74(28.7) | 2.98(2.8) | 10.90(11.2) | | [2]31.68(31.8) |
| 5 | 207–210 | 35.96(36.7) | 3.24(3.1) | 17.91(18.3) | 28.23(27.9) | |
| 6 | 158–160 | 34.10(34.3) | 2.95(2.9) | 16.95(17.1) | 23.38(26.1) | |
| 7 | 146–150 | 31.90(32.2) | 3.07(2.7) | 15.23(16.1) | 23.48(24.5) | |
| 8 | Oil | 47.91(47.8) | 6.01(6.0) | 13.92(14.0) | 16.03(16.0) | |
| 9 | Oil | | | 11.41(10.9) | | |
| 10 | 142–146 | 56.52(54.2) | 4.29(4.5) | 12.10(12.6) | 14.39(14.3) | |
| 11 | 183–186 | 49.00(49.5) | 3.16(3.1) | 14.51(14.4) | | |
| 12 | 200–202 | 38.32(38.1) | 2.37(2.3) | 7.86(8.1) | | |
| 13 | 178–180 | 38.02(38.1) | 2.56(2.3) | 7.65(8.1) | 9.59(9.2) | |
| 14 | 142–144 | 49.38(49.2) | 3.36(3.4) | 10.11(10.4) | 12.02(11.9) | |
| 15 | 192–194 | 43.29(44.3) | 2.57(2.5) | 12.78(12.9) | 19.94(19.7) | |
| 16 | 120–123 | 47.90(47.1) | 3.16(2.8) | 10.98(11.0) | 12.24(12.6) | |
| 17 | 162–164 | 49.78(49.3) | 3.58(3.4) | 10.78(10.4) | 11.72(11.9) | |
| 18 | 199–201 | 38.28(38.1) | 2.45(2.3) | 8.19(8.1) | 9.38(9.2) | |
| 19 | 235–237 | 34.42(34.6) | 1.84(1.9) | 7.20(7.3) | | |
| 20 | 195–207 | 44.42(43.4) | 2.89(2.6) | 8.56(9.2) | 10.87(10.6) | |
| 21 | 118–120 | 39.96(40.0) | 2.10(2.0) | 11.52(11.7) | 18.22(17.8) | |
| 22 | 170–173 | 46.18(46.2) | 4.03(3.9) | 9.01(9.0) | 20.92(10.5) | |
| 23 | 163–168 | 39.50(42.2) | 3.46(3.0) | 11.65(11.1) | 26.01(26.1) | |
| 24 | 199–203 | 38.79(38.4) | 2.98(2.9) | 6.95(7.5) | 16.66(17.1) | |
| 25 | 103–105 | 41.91(41.8) | 4.71(4.7) | 16.10(16.3) | 18.22(18.6) | |
| 26 | 84–88 | 45.06(44.9) | 5.67(5.4) | 14.66(15.0) | 16.90(17.1) | |
| 27 | 53–56 | 44.86(44.9) | 5.45(5.4) | 14.89(15.0) | 17.05(17.1) | |
| 28 | 194–197 | 25.80(25.3) | 2.58(2.1) | 11.60(11.9) | 12.75(13.6) | |
| 29 | 134–137 | 52.88(52.8) | 4.19(4.0) | 11.23(11.2) | 12.68(12.8) | |
| 30 | 140–145 | 52.16(52.8) | 4.40(4.1) | 11.13(11.2) | 12.20(12.8) | |
| 31 | 195–198 | 45.97(45.3) | 2.68(2.7) | 15.79(15.9) | 11.87(12.1) | |
| 32 | 172–174 | 41.51(41.6) | 2.10(2.1) | 9.67(9.7) | | |
| 33 | 60–62 | 61.41(61.5) | 8.84(9.0) | 8.90(9.0) | 10.12(10.3) | |
| 34 | 179–180 | 41.41(41.6) | 2.27(2.1) | 9.77(9.7) | 10.89(11.1) | |
| 35 | 80–83 | 42.02(41.7) | 4.64(4.3) | 11.41(12.2) | | |
| 36 | 225–230 | 45.59(45.3) | 2.79(2.7) | 15.75(15.9) | 11.98(12.1) | |
| 37 | 53–56 | 44.77(45.2) | 5.46(5.4) | 14.41(15.1) | 16.50(17.2) | |
| 38 | 73–103 | 41.44(41.7) | 4.86(5.0) | 13.79(13.9) | 31.60(31.7) | |
| 39 | 53–55 | 35.12(34.87) | 3.42(3.39) | 13.47(13.56) | 15.33(15.50) | 17.31(17.19) |
| 40 | 65–68 | 50.28(50.3) | 6.17(6.33) | 9.83(9.78) | 22.30(22.3) | |
| 41 | 75–79 | 46.76(53.5) | 6.76(7.06) | 8.42(8.92) | 16.43(20.4) | |
| 42 | 99 | 52.10(53.5) | 7.11(7.06) | 8.54(8.92) | 19.35(20.4) | |
| 43 | 109–111 | 58.96(59.0) | 7.20(7.10) | 7.59(7.65) | 17.41(17.5) | |
| 44 | 97–100 | 61.91(62.0) | 9.03(9.0) | 6.55(6.57) | 14.89(15.03) | |
| 45 | 78–80 | 62.82(62.8) | 4.84(4.7) | 7.22(7.3) | 16.97(16.75) | |
| 46 | 44–47 | 32.80(32.1) | 2.64(2.7) | 9.55(9.5) | 20.79(21.4) | 23.48(23.7) |
| 47 | 57–59 | 53.19(53.2) | 3.46(3.6) | 6.18(6.2) | 13.80(14.2) | 15.01(15.74) |
| 48 | 114–117 | 27.31(26.1) | 1.43(1.6) | 7.22(7.6) | 17.42(17.4) | 37.89(38.6) |
| 49 | 58–68 | 45.99(46.4) | 5.77(5.4) | 11.38(10.8) | 24.39(24.8) | |
| 50 | 161–163 | 45.92(45.8) | 2.88(2.7) | 5.59(5.35) | 11.91(12.2) | 26.93(27.1) |
| 51 | 131–133 | 43.95(43.9) | 1.95(2.05) | 5.66(5.69) | 13.09(13.0) | |
| 52 | 62–64 | 47.10(46.1) | 2.86(2.7) | 5.35(5.4) | 12.48(12.3) | 26.40(27.4) |
| 53 | 86–87 | 22.24(21.0) | 1.81(1.3) | 5.82(6.1) | 13.83(14.0) | 15.63(15.5) |
| 54 | 94–97 | 25.68(24.7) | 1.75(2.0) | 7.22(7.2) | | [2]32.78(34.9) |
| 55 | 124–126 | 36.43(36.5) | 3.75(3.7) | 10.44(10.7) | 24.30(24.4) | [2]39.78(41.2) |
| 56 | Oil | 52.70(54.1) | 6.35(8.06) | 14.17(14.0) | 13.70(16.0) | [3]216(200) |
| 57 | 87–90 | 38.64(40.2) | 5.88(5.61) | 7.50(7.79) | 16.85(17.83) | 17.85(19.7) |
| 58 | | 25.78(25.8) | 3.17(2.7) | 7.07(7.5) | 14.9(17.2) | 32.83(38.1) |
| 59 | 144–146 | 36.44(36.3) | 4.80(4.8) | 8.30(8.5) | 19.20(19.3) | 21.27(21.5) |
| 60 | 162–166 | 30.76(31.8) | 4.27(4.0) | 8.89(9.3) | 20.79(21.2) | 22.24(23.5) |
| 61 | 147–153 | 52.78(52.8) | 4.60(4.39) | 6.33(6.51) | 14.21(14.1) | 15.64(15.6) |
| 62 | 46–49 | 66.98(66.9) | 9.90(10.0) | 5.25(5.2) | 11.72(11.90) | |
| 63 | 53–55 | 68.86(68.7) | 10.61(10.5) | 4.68(4.7) | 10.88(10.8) | |
| 64 | 87–88 | 52.78(53.2) | 3.54(3.6) | 6.02(6.3) | 14.59(14.2) | 15.75(15.7) |
| 65 | 99–100 | 53.39(53.2) | 3.69(3.6) | 6.18(6.3) | 13.95(14.2) | 15.96(15.7) |
| 66 | 122–124 | 46.18(46.2) | 2.80(2.7) | 5.25(5.4) | 12.46(12.3) | 26.85(27.3) |
| 67 | 87–89 | 45.87(46.2) | 2.62(2.7) | 5.15(5.4) | 12.12(12.3) | 27.33(27.3) |
| 68 | 80–82 | 59.74(59.7) | 4.96(5.0) | 6.25(6.3) | 14.58(14.5) | |
| 69 | 76–77 | 64.60(64.4) | 5.32(5.4) | 6.60(6.8) | 15.60(15.6) | |
| 70 | [4]119–120(.005 mm.) | 60.81(62.0) | 8.88(8.9) | 6.46(6.6) | 14.70(15.0) | |
| 71 | 76–78 | 64.35(64.5) | 5.49(5.4) | 6.75(6.8) | 15.40(15.6) | |
| 72 | 55–59 | 55.22(55.2) | 3.95(4.2) | 5.62(5.9) | 13.16(13.4) | 14.51(14.8) |
| 73 | [4]138–140(.003 mm.) | 62.52(64.5) | 5.27(5.4) | 6.45(6.8) | 14.10(15.6) | |
| 74 | 41–42 | 64.80(64.7) | 9.31(9.6) | 5.46(5.8) | 13.49(13.2) | |
| 75 | [4]120(0.01 mm.) | 62.00(62.0) | 8.81(8.9) | 6.48(6.6) | 14.89(15.0) | |
| 76 | 137–140 | 52.38(53.5) | 7.81(7.3) | 5.62(5.7) | | 12.19(14.5) |
| 77 | 138–142 | 44.76(45.2) | 6.48(6.2) | 4.58(4.8) | 10.82(11.0) | [2]25.8(27.4) |
| 78 | 30–31 | 63.34(63.45) | 9.40(9.29) | 6.08(6.17) | 13.97(14.10) | |
| 79 | Oil | 55.05(53.4) | 7.76(7.3) | 5.76(5.7) | | 11.13(14.35) |
| 80 | 170–175 dec. | 48.62(48.7) | 2.78(2.72) | 12.77(12.60) | | |
| 81 | 141–142 | 58.12(57.8) | 4.46(4.44) | 5.70(5.62) | 12.79(12.85) | |

[1] The number parenthesized represents the theoretical value, as calculated, using the empirical formula of each compound.
[2] Analysis for bromine.
[3] Neutralization equivalent.
[4] Boiling Point in °C.

The novel isothiazones and salts of this invention are biocidally active compounds, and as such, are suitable for the control of living organisms and particularly microorganisms. For this reason, they are especially effective bactericidal, algaecidal, fungicidal and pesticidal agents. Furthermore, these novel compounds possess the unexpected property of being resistant to inhibition by common additives or contaminants, such as lecithin, normal horse serum, alkylbenzene sulfonates, water-soluble lanolin, sodium chromate, sodium nitrite, glycerol, propylene glycol and the like.

It was also determined that other isothiazones, namely, 2-methyl-3-isothiazoline and 2-ethyl-3-isothiazolone are likewise effective for the control of living organisms. These compounds were described by Leonard and Crow in the Journal of Organic Chemistry article previously cited. However, Leonard and Crow did not attribute any biocidal properties to the compounds in question. Such characteristics were unknown until the present discovery.

Fungicidal evaluation of the isothiazolones of this invention along with the Leonard and Crow compounds was carried out by the standard slide spore germination test (cf. Phytopathology, 33, 627 (1943)), utilizing spores of *Alternaria solani* (Alt.), *Sclerotinia fructicola* (Scl.) and *Stemphylium sarcinaeforme* (Stem.) or *Botrytis cinerea* (Bot.). The values obtained for the concentration in parts per million (p.p.m.) which effectively controlled 50% of the spores ($ED_{50}$) are given in Table III.

Antibacterial activity was evalutaed by the Serial Dilution Test (Broth Titer Test) wherein a series of broths containing varying dilutions of a test compound and an organism are halved starting with 1:1000. The values obtained, which are also shown in Table III, represent the maximum dilution at which the compound under evaluation renders complete control of the organism. *Staphylococcus aureus* (*S. aureus*) and *Escherichia coli* (*E. coli*) were the baterial organisms employed in this test.

Selected isothiazolones were also evaluated as algaecides by the Fitzgerald Test (Applied Microbiology, 7, 205–211, No. 4, 1959) and found to be exceptionally effective.

Further fungicidal activity on the part of the isothiazolones was demonstrated by their utilization in seed treatment applications. By seed treatment is meant the disseminating of a biocidally active material over a seed subject to the attack of microorganisms, and particularly fungi, in an amount which is effective to control such microorganisms without deleteriously effecting such seed. In most circumstances, the biocidally active material, in this case, the isothiazolones or compositions thereof will

TABLE III.—MICROBIOLOGICAL ACTIVITY

| Example No. | Fungicidal Evaluation | | | Bacteriostatic Evaluation | |
|---|---|---|---|---|---|
| | Alt. | Scl. | Stem. (Bot.a) | S. aureus | E. coli |
| 1 | <1 | <1 | <1 | 1:64,000 | 1:32,000 |
| 2 | 1–10 | <1 | 1–10 | 1:64,000 | 1:16,000 |
| 3 | | | | 1:32,000 | 1:8,000 |
| 4 | <1 | <1 | <1 | 1:2,000 | 1:1,000 |
| 5 | 1–10 | <1 | <1 | <1:1,000 | 1:1,000 |
| 6 | 10–50 | 10–50 | 10–50 | 1:2,000 | 1:1,000 |
| 7 | 10–50 | 10–50 | 10–50 | 1:1,000 | 1:1,000 |
| 8 | <1 | <1 | 1–10 | 1:32,000 | 1:4,000 |
| 9 | 10–50 | 10–50 | 10–50 | 1:32,000 | 1:8,000 |
| 10 | 10–50 | 10–50 | 10–50 | 1:1,000 | 1:1,000 |
| 11 | 50–200 | 50–200 | 10–50 | | |
| 12 | 10–50 | 10–50 | 10–50 | 1:1,000 | 1:1,000 |
| 13 | 50–200 | 50–200 | 10–50 | 1:1,000 | 1:1,000 |
| 14 | 10–50 | <1 | 10–50 | 1:1,000 | 1:1,000 |
| 15 | 200–1,000 | >1,000 | 50–200 | 1:1,000 | 1:2,000 |
| 16 | 1–10 | 1–10 | 10–50 | 1:8,000 | 1:8,000 |
| 17 | 50–200 | 10–50 | 10–50 | 1:1,000 | 1:1,000 |
| 18 | 200–1,000 | 200–1,000 | 50–200 | 1:4,000 | 1:1,000 |
| 19 | >1,000 | >1,000 | >1,000 | <1:1,000 | <1:1,000 |
| 20 | >1,000 | >1,000 | >1,000 | | |
| 21 | >1,000 | >1,000 | >1,000 | | |
| 22 | 50–200 | 50–200 | 50–200 | 1:1,000 | 1:1,000 |
| 23 | 200–1,000 | 200–1,000 | 200–1,000 | 1:1,000 | 1:1,000 |
| 24 | 200–1,000 | 50–200 | 50–200 | 1:1,000 | 1:4,000 |
| 25 | 10–50 | 10–50 | 10–50 | 1:256,000 | 1:16,000 |
| 26 | 10–50 | 10–50 | 10–50 | 1:64,000 | 1:8,000 |
| 27 | 10–50 | 50–200 | 10–50 | 1:64,000 | 1:4,000 |
| 28 | 1–10 | <1 | 10–50 | 1:4,000 | 1:2,000 |
| 29 | | | | 1:8,000 | 1:8,000 |
| 30 | | | | 1:8,000 | 1:8,000 |
| 31 | | | | 1:2,000 | 1:2,000 |
| 32 | 1–10 | 50–200 | 10–50 | 1:512,000 | 1:8,000 |
| 33 | >1,000 | >1,000 | >1,000 | 1:2,000 | 1:1,000 |
| 34 | 10–50 | 10–50 | 50–200 | 1:8,000 | 1:2,000 |
| 35 | <1 | 10–50 | a10–50 | 1:8,000 | 1:2,000 |
| 36 | 10–50 | 50–200 | a10–50 | 1:4,000 | 1:2,000 |
| 37 | 50–200 | <1 | a10–50 | 1:8,000 | 1:16,000 |
| 38 | 10–50 | 50–200 | <1 | 1:32,000 | 1:4,000 |
| 39 | | | | 1:16,000 | 1:32,000 |
| 40 | <1 | <1 | <1 | 1:8,000 | 1:32,000 |
| 41 | 10–50 | 1–10 | 1–10 | 1:4,000 | 1:8,000 |
| 42 | <1 | 10–50 | 10–50 | 1:8,000 | 1:32,000 |
| 43 | <1 | <1 | <1 | 1:32,000 | 1:8,000 |
| 44 | | | | 1:8,000 | 1:1,000 |
| 45 | | | | 1:32,000 | 1:64,000 |
| 46 | | | | 1:128,000 | 1:256,000 |
| 47 | | | | 1:64,000 | 1:64,000 |
| 48 | | | | 1:32,000 | 1:64,000 |
| 49 | | | | 1:2,000 | 1:4,000 |
| 50 | <1 | <1 | <1 | 1:256,000 | 1:1,000 |
| 51 | <1 | <1 | <1 | 1:512,000 | 1:2,000 |
| 52 | | | | 1:128,000 | 1:64,000 |
| 53 | | | | 1:128,000 | 1:64,000 |
| 54 | | | | | |
| 55 | | | | 1:8,000 | 1:32,000 |
| 56 | | | | 1:8,000 | 1:4,000 |
| 57 | 1–10 | 10–50 | 10–50 | 1:32,000 | 1:8,000 |
| 58 | | | | 1:256,000 | 1:128,000 |
| 59 | 10–50 | 50–200 | 50–200 | 1:16,000 | 1:8,000 |
| 60 | <1 | <1 | <1 | 1:32,000 | 1:32,000 |
| 61 | 1–10 | 1–10 | 10–50 | 1:32,000 | 1:32,000 |
| 62 | | | | 1:1,000,000 | 1:1,000 |
| 63 | | | | 1:1,900 | <1:1,000 |
| 64 | | | | 1:64,000 | 1:16,000 |
| 65 | | | | 1:64,000 | 1:16,000 |
| 66 | | | | 1:256,000 | 1:4,000 |
| 67 | | | | 1:256,000 | 1:16,000 |
| 68 | | | | 1:16,000 | 1:8,000 |
| 69 | | | | 1:32,000 | 1:8,000 |
| 70 | | | | 1:64,000 | 1:2,000 |
| 71 | | | | 1:16,000 | 1:8,000 |
| 72 | | | | 1:64,000 | 1:64,000 |
| 73 | | | | 1:32,000 | 1:8,000 |
| 74 | | | | 1:2,000,000 | 1:16,000 |
| 75 | | | | 1:128,000 | 1:8,000 |
| 76 | | | | 1:8,000 | <1:1,000 |
| 77 | | | | 1:8,000 | <1:1,000 |
| 78 | | | | 1:512,000 | 1:8,000 |
| 79 | | | | 1:8,000 | 1:16,000 |
| 2-methyl-3-isothiazolone | <1 | <1 | <1 | 1:16,000 | 1:32,000 |
| 2-ethyl-3-isothiazolone | <1 | <1 | | 1:8,000 | 1:16,000 | be applied to the surface area of the seeds to be treated. This may be accomplished by varying means common to the art, such as slurrying, soaking, dusting, spraying and the like.

The amount of isothiazolone required so as to be effective in a seed treatment application will vary depending upon conditions, such as the type of seed, the method of application, soil and atmospheric conditions and the like. Generally, an application in the range of about 0.25 to 20 ounces of active ingredient, namely, the isothiazolone per 100 pounds of seed will be effective to control any undesirable microorganisms and so provide protection to the seed. An application of active agent in the range of about 1.0 to 10 ounces per 100 pounds of seed is preferred.

An experimental technique was employed to demonstrate the effectiveness of these compounds for seed treatment. This involved slurrying two lots of 100 corn seeds each with the isothiazolone under evaluation at a level of 1 to 2 ounces per bushel of seed. For purposes of comparison, an untreated control was also included. After drying, the seeds were planted in a muck soil infested with *Pythium* and having a high moisture content. The corn seeds were maintained in this soil for a week at about 10° C. so as to permit infection. Upon completion of this period of time, the temperature was elevated and maintained at about 21° to 27° C. so as to permit germination of the non-infected seed. The number of seeds germinating were counted after emergence of the plant and such data is set forth in Table IV.

TABLE IV.—SEED TREATMENT

| Test compound: | No. of plants germinating/200 seeds |
|---|---|
| Untreated | 10 |
| 2-t-butyl-3-isothiazolone | 100 |
| 2-n-octyl-3-isothiazolone | 144 |
| 2-t-octyl-3-isothiazolone | 184 |
| 2-n-nonyl-3-isothiazolone | 164 |
| 2-methyl-5-chloro-3-isothiazolone | 150 |
| 2-methyl-4,5-dichloro-3-isothiazolone | 140 |
| 2-n-octyl-5-chloro-3-isothiazolone | 150 |
| 2-t-octyl-4-chloro-3-isothiazolone | 160 |
| 2-t-octyl-4-bromo-3-isothiazolone | 148 |
| 2-(2,4-dichlorobenzyl)-3-isothiazolone | 80 |
| 2-(2-ethylhexyl)-3-isothiazolone | 182 |
| 2-(1-phenylethyl)-3-isothiazolone | 176 |
| 2-(2-phenylethyl)-3-isothiazolone | 160 |

Evaluation of the isothiazolones with regard to pesticidal activity demonstrated their exceptional control of numerous nematodes, mites, insects, such as beetles and aphids, and the like. Some typical nematodes, insects and mites which were controlled when contacted with the compounds of this invention included the following: Northern root knot nematode (*Meloidogyne hapla*), Mexican bean beetle (*Epilachna varivesta*), black carpet beetle (*Attagenus piceus*), confused flour beetle (*Tribolium confusum*), granary weevil (*Sitophilus granarius*), two spotted mite (*Tetranychus urticae*), house fly (*Musca domestica*), Southern armyworm (*Prodenia eridania*), German cockroach (*Blattella germanica*), and green peach aphid (*Myzus persicae*).

Generally, control of a living organism is achieved in accordance with this invention by contacting the organism with an isothiazolone in an amount which is effective to control said organism. Any of the techniques known in the art may be employed to disseminate the isothiazolones in a manner so as to achieve the desired contact with the organism to be controlled. Spraying and fumigating are typical of such techniques.

The compounds of this invention may be readily utilized as slimicides, algaecides, bactericides, fungicides or combinations thereof in any loci and particularly in aqueous media, such as for example, water-cooling systems, swimming pools, paper pulp processes, etc. In addition, these compounds and/or compositions thereof may serve functions, such as for example, preservatives, especially fabric preservatives, soap additives, sanitizing agents, and preservatives for metal working compounds and the like.

In general, a loci subject to attack by microorganisms may be protected in accordance with this invention by incorporating into said loci an isothiazolone or salt thereof in an amount which is effective to control said microorganisms. The exact amount of isothiazolone required will, of course, vary with the medium being protected, the microorganisms being controlled, the particular isothiazolones or compositions thereof being employed and the like. Typically, in a liquid media, excellent control is obtained when the isothiazolones are incorporated in the range of 0.1 to 10,000 parts per million (p.p.m.) or 0.00001 to 1% based on the weight of the medium. A range of 1 to 2000 p.p.m. is preferred.

The term "control," as employed in the specification and claims of this application is to be construed as any means which adversely affects the existence or growth of any living organism or microorganism. Such means may comprise a complete killing action, eradication, arresting in growth, inhibition, reduction in number or any combination thereof.

Outstanding fungistatic activity by the isothiazolones was exhibited when they were employed as paint preservatives and paint fungistats. Microbial activity in acrylic based paint emulsions is effectively inhibited when these compounds are incorporated at the rate of about 2–20 pounds or more per 100 gallons of paint.

The isothiazolones of this invention are especially useful as agricultural fungicides. As such, they are particularly valuable when formulated in a fungicidal composition. Such compositions normally comprise an agronomically acceptable carrier and the compounds disclosed herein as the active agent or agents. Where necessary or desirable, surfactants or other additives may be incorporated to give uniformly formulated mixtures. By "agronomically acceptable carrier" is meant any substance which can be utilized to dissolve, dispense or diffuse the chemical incorporated therein without impairing the effectiveness of the toxic agent and which does no permanent damage to such environment as soil, equipment and agronomic crops.

For use as pesticides, the compounds of this invention are usually taken up in an agronomically acceptable carrier or formulated so as to render them suitable for subsequent dissemination. For example, the isothiazolones may be formulated as wettable powders, emulsion concentrates, dusts, granular formulations, aerosols or flowable emulsifiable concentrates. In such formulations, the isothiazolones are extended with a liquid or solid carrier and, when desired, suitable surfactants are likewise incorporated.

Compounds of this invention may be dissolved in a water-miscible liquid, such as ethanol, isopropanol, acetone, and the like. Such solutions are easily extended with water.

The isothiazolones may be taken up on or mixed with a finely particled solid carrier, as for example, clays, inorganic silicates, carbonates, and silicas. Organic carriers may also be employed. Dust concentrates are commonly made wherein isothiazolones are present in the range of 20 to 80%. For ultimate applications, these concentrates are normally extended with additional solid from about 1 to 20%.

Wettable powder formulations are made by incorporating the compounds of this invention in an inert, finely divided solid carrier along with a surfactant which may be one or more emulsifying, wetting, dispersing or spreading agents or blend of these. The isothiazolones are usually present in the range of 10 to 80% by weight and the surfactants in from 0.5% to 10% by weight. Commonly used emulsifying and wetting agents include polyoxyethylated derivatives of alkylphenols, fatty alcohols, fatty acids, and alkylamines; alkylarene sulfonates and dialkyl sulfosuccinates. Spreading agents include such materials as glycerol mannitan laurate and a condensate and a condensate of polyglycerol and oleic acid modified with phthalic anhydride. Dispersing agents include such materials as the sodium salt of the copolymer of maleic anhydride and an olefin such as diisobutylene, sodium lignin sulfonate and sodium formaldehydenaphthalene sulfonates.

One convenient method for preparing a solid formulation is to impregnate the isothiazolone toxicant onto the solid carrier by means of a volatile solvent, such as acetone. In this manner, adjuvants, such as activators, adhesives, plant nutrients, synergists and various surfactants, may also be incorporated.

Emulsifiable concentrate formulations may be prepared by dissolving the isothiazolones of this invention in an agronomically acceptable organic solvent and adding a solvent-soluble emulsifying agent. Suitable solvents are usually water-immiscible and may be found in the hydrocarbon, chlorinated hydrocarbon, ketone, ester, alcohol and amide classes of organic solvents. Mixtures of solvents are commonly employed. The surfactants useful as emulsifying agents may constitute about 0.5 to 10% by weight of the emulsifiable concentrate and may be anionic, cationic or non-ionic in character. Anionic surfactants include alcohol sulfates or sulfonates, alkylarene sulfonates and sulfosuccinates. Cationic surfactants include fatty acid alkylamine salts and fatty acid alkyl quaternaries. Non-ionic emulsifying agents include ethylene oxide adducts of alkylphenols, fatty alcohols, mercaptans and fatty acids. The concentrate of the active ingredients may vary from 10 to 80%, preferably in the range of 25 to 50%.

For use as phytopathogenic agents, these compounds should be applied in an effective amount sufficient to exert the desired biocidal activity by techniques well known in the art. Usually, this will involve the application of the isothiazolones to the loci to be protected in an effective amount when incorporated in an agronomically acceptable carrier. However, in certain situations it may be desirable and advantageous to apply the compounds directly onto the loci to be protected without the benefit of any substantial amount of carrier. This is a particularly effective method when the physical nature of the isothiazolones is such as to permit what is known as "low-volume" application, that is, when the compounds are in liquid form or substantially soluble in higher boiling solvents.

The application rate will, of course, vary depending upon the purpose for such application, the isothiazolones being utilized, the frequency of dissemination and the like.

For use as agricultural bactericides and fungicides, dilute sprays may be applied at concentrations of 0.05 to 20 pounds of the active isothiazolones ingredient per 100 gallons of spray. They are usually applied at 0.1 to 10 pounds per 100 gallons and preferably at 0.125 to 5 pounds per 100 gallons. In more concentrated sprays, the active ingredient is increased by a factor of 2 to 12. With dilute sprays, applications are usually made to the plants until run-off is achieved, whereas with more concentrated or low-volume sprays the materials are applied as mists.

The compounds of this invention may be utilized as the sole biocidal agents or they may be employed in conjunction with other fungicides, insecticides, miticides and comparable pesticides.

In field tests, the isothiazolones described above were effective in controlling fungi which cause broccoli downy mildew (*Peronospora parasitica*), bean powdery mildew (*Erysiphe polygoni*), wheat powdery mildew (*Erysiphe graminis*), rice blast (*Piricularia oryzae*), and tomato blights (*Phytophthora infestans*) and (*Alternaria solani*).

We claim:

1. A compound of the formula

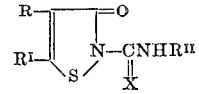

wherein

R is hydrogen, a lower alkyl group, halogen or cyano;

$R^I$, when R is hydrogen, a lower alkyl group, or halogen, is hydrogen, halogen, or a lower alkyl group;

$R^I$, when R is cyano, is a lower alkylthio group, a lower alkylsulfinyl group of a lower alkylsulfonyl group;

X is oxygen or sulfur; and $R^{II}$ is an alkyl group of 1 to 18 carbon atoms, a lower alkylsulfonyl group, a phenyl sulfonyl group, a halogen- or lower alkyl-substituted phenyl sulfonyl group, a carbalkoxyalkyl group of the formula

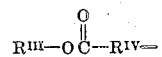

wherein $R^{III}$ is a lower alkyl group and $R^{IV}$ is an alkylene group of 1 to 4 carbon atoms; or an aryl group of the formula

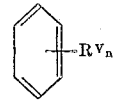

wherein $R^V$ is a lower alkyl group, halogen, nitro or an alkoxy group of 1 to 4 carbon atoms, and $n$ is an integer from 0 to 3.

2. A compound according to claim 1 wherein X is oxygen.

3. A compoudn according to claim 2 wherein $R^{II}$ is alkyl of 1 to 18 carbon atoms.

4. A compound according to claim 1 wherein R is halogen.

5. A compound according to claim 1 wherein $R^I$ is halogen.

6. A compound according to claim 3 wherein said compound is 2-(N-methylcarbamoyl)-3-isothiazolone.

7. A compound according to claim 3 wherein said compound is 2-(N-ethylcarbamoyl)-3-isothiazolone.

References Cited

Crow et al.: J. Org. Chem., 30, 2664 (1965).

Theilheimer: Synthetic Methods, 8:157, 9:171, 18:241 (1964).

Wagner et al.: Synthetic Organic Chemistry, p. 645 (1953).

ALEX MAZEL, Primary Examiner

R. J. GALLAGHER, Assistant Examiner

U.S. Cl. X.R.

106—15; 260—302; 424—270